United States Patent
Matsuo et al.

(10) Patent No.: US 6,819,847 B2
(45) Date of Patent: Nov. 16, 2004

(54) OPTICAL FIBER AND OPTICAL TRANSMISSION PATH

(75) Inventors: Shoichiro Matsuo, Sakura (JP); Kuniharu Himeno, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 134 days.

(21) Appl. No.: 10/346,867

(22) Filed: Jan. 17, 2003

(65) Prior Publication Data

US 2003/0152347 A1 Aug. 14, 2003

(30) Foreign Application Priority Data

Jan. 22, 2002 (JP) .......................... 2002-013156
Mar. 14, 2002 (JP) .......................... 2002-070832

(51) Int. Cl.$^7$ .............................. G02B 6/02; H04J 14/02
(52) U.S. Cl. ........................ 385/123; 385/126; 385/127; 398/81
(58) Field of Search ................... 385/123, 124, 385/126, 127; 398/81

(56) References Cited

U.S. PATENT DOCUMENTS

| 5,483,612 | A | 1/1996 | Gallagher et al. ...... 385/127 X |
| 5,905,838 | A | 5/1999 | Judy et al. ................. 385/123 |
| 6,169,837 | B1 | 1/2001 | Kato et al. ................. 385/127 |
| 6,483,975 | B1 * | 11/2002 | Hsu et al. .................. 385/123 |
| 6,577,800 | B2 * | 6/2003 | Sarchi et al. .............. 385/123 |
| 6,633,715 | B2 * | 10/2003 | Knudsen et al. .......... 385/127 |
| 6,707,976 | B1 * | 3/2004 | Gruner-Nielsen et al. .. 385/123 |
| 2001/0006572 | A1 | 7/2001 | Kato et al. |
| 2001/0019651 | A1 | 9/2001 | Kato ...................... 385/123 X |
| 2002/0097971 | A1 | 7/2002 | Mukasa et al. |
| 2002/0102082 | A1 * | 8/2002 | Sarchi et al. .............. 385/123 |
| 2002/0186941 | A1 * | 12/2002 | Hsu et al. .................. 385/123 |
| 2003/0113084 | A1 * | 6/2003 | Knudsen et al. .......... 385/127 |
| 2003/0152347 | A1 * | 8/2003 | Matsuo et al. ............ 385/123 |
| 2004/0042748 | A1 * | 3/2004 | Gruner-Nielsen et al. .. 385/127 |
| 2004/0109656 | A1 * | 6/2004 | Aikawa et al. ............ 385/127 |

FOREIGN PATENT DOCUMENTS

| WO | WO-00/17681 A1 | 3/2000 | ............ 385/123 X |
| WO | WO-02/16970 A2 | 2/2002 | ............ 385/123 X |

OTHER PUBLICATIONS

Y.W. Li et al., "Triple–Clad Single–Mode Fibers for Dispersion Shifting", Journal of Lightwave Technology, IEEE, New York, vol. 11, No. 11, Nov. 1, 1993, XP000416677, pp. 1812–1819.

A. Safaai–Jazi et al., "New Designs for Dispersion–shifted and Dispersion–flattened Fibers", Proceedings of teh SPIE, SPIE, Bellingham, VA, USA, vol. 1176, Sep. 5, 1989, XP000674818, pp. 196–201.

* cited by examiner

Primary Examiner—Brian M. Healy
(74) Attorney, Agent, or Firm—Darby & Darby

(57) ABSTRACT

An optical fiber having a chromatic dispersion of +1.0 ps/nm/km or more in a 1460 nm wavelength band, a dispersion slope of 0.04 ps/nm$^2$/km or less in a 1550 nm wavelength band, and a cutoff wavelength of 1450 nm or less, comprises a relation of an RDS, which is a value of the dispersion slope to the chromatic dispersion, to a wavelength $\lambda$ is $-1.67\times10^{-5}\lambda+0.0300 \geq RDS(\lambda) \geq -1.67\times10^{-5}\lambda+0.0285$.

12 Claims, 9 Drawing Sheets

OPTICAL FIBER AND OPTICAL TRANSMISSION PATH

BACKGROUND OF THE INVENTION

1. Field of the Invention

The present invention relates to a non-zero dispersion shifted fiber (hereinafter, abbreviated to "NZ-DSF") used for wavelength division multiplexing (hereinafter, abbreviated to "WDM"), and in particular, relates to an NZ-DSF showing chromatic dispersion characteristics enabling transmission over an S-band (short wavelength band, 1460 to 1530 nm) to C-band (conventional band, 1530 to 1565 nm) to L-band (long wavelength band, 1565 to 1625 nm), and showing a relative dispersion slope (hereinafter, abbreviated to "RDS") which is almost the same RDS of a slope compensating dispersion compensation fiber (hereinafter, abbreviated to "SC-DCF") conventionally used for a single mode optical fiber.

2. Description of Related Art

Capacities of optical transmission systems have been increasing significantly using the WDM method. In the WDM method, reduction of non-linear effects and control of chromatic dispersion are required in transmission optical fibers.

In general, the non-linear effects in an optical fiber is represented by $n_2/A_{\it eff}$, where $n_2$ is a non-linear refractive index of the optical fiber and $A_{\it eff}$ is an effective core area of the optical fiber. Therefore, the non-linear effects are inversely proportional to $A_{\it eff}$. Accordingly, various optical fibers are developed such as optical fibers having enlarged effective core area $A_{\it eff}$, optical fibers having reduced dispersion slope, and optical fibers which compensates dispersion slopes.

In order to increase the transmission capacity based on the WDM method, two methods are mainly used. The first method is a method of increasing the number of waves for multiplexing, and the second method is a method of improving the transmission speed.

As the method of increasing the number of waves for multiplexing, there is a trend of broadening the wavelength band for transmission. A 1550 nm-band is mainly used as a wavelength band for the WDM method. In the 1550 nm-band, a band known as the C-band has been widely used, but in recent years, there has been a trend of the use of the L-band and S-band for communication.

Therefore, various optical fibers are proposed such as optical fibers for use in C-band and L-band, and optical fibers having larger chromatic dispersion for use in S-, C- and L-bands.

Furthermore, in order to increase transmission speed, the transmission system is shifted from 2.5 Gb/s to 10 Gb/s, and also to 20 Gb/s or 40 Gb/s of the high-speed transmission system.

Several optical fibers for the transmission over S- to C- to L-bands have been already proposed. Examples of chromatic dispersion characteristics of such optical fibers are shown in FIG. 12.

One is a system of an SC-DCF in combination to a single-mode fiber for use in the 1.3 μm band (hereinafter abbreviated to "1.3 SMF"). Using the SC-DCF having the RDS wavelength characteristics which is almost the same RDS wavelength characteristics of 1.3 SMF, dispersion compensation can be over wide range. The RDS is a parameter defined by the following expression 1.

$$RDS = \frac{\text{Dispersion slope}}{\text{Chromatic dispersion}} [\text{nm}^{-1}] \quad (1)$$

When the SC-DCF having the same RDS as the 1.3 SMF and having a chromatic dispersion value which is positive or negative so as to be opposite to that of the 1.3 SMF, is used in the system, dispersion slope in addition to chromatic dispersion can be compensated.

However, the chromatic dispersion at the wavelength 1550 nm band of 1.3 SMF is very a large value of +17 ps/nm/km. According to increasing the transmission speed, the interval of dispersion compensation is required to be shorter. When the 1.3 SMF has 2.5 Gb/s of transmission speed, the transmission distance can be about 1000 km. However, when the 1.3 SMF has 10 Gb/s of transmission speed, the transmission distance is 50 km, and when the 1.3 SMF has 40 Gb/s, the transmission distance is 4 km.

In view of limiting the transmission distance by accumulated dispersion, the NZ-DSF having characteristics shown in continuous line (a) and dashed line (b) of FIG. 14 is superior to the 1.3 SMF. However, a conventional NZ-DSF has a zero dispersion wavelength around 1500 nm, and as a result, the WDM transmission cannot be carried out at the S-band. To solve this problem, recently, an optical fiber, taking the S-band transmission into consideration, was developed.

For example, in an optical fiber (trade name: "Teralight™" trade mark) having characteristics shown in chain line (c) of FIG. 14, the chromatic dispersion at the wavelength 1550 nm band is set to about +8 ps/nm/km, resulting in the S-band transmission. However, the optical fiber has larger chromatic dispersion than the conventional NZ-DSF over S-band to C-band to L-band. As a result, the optical fiber has a shorter transmissible distance without dispersion compensation than the conventional NZ-DSF.

Furthermore, as an optical fiber in which the WDM transmission can be carried out to the S-band range, an NZ-DSF in which a dispersion slope is decreased up to 0.02 ps/nm/km is reported. The chromatic dispersion characteristics are shown in a chain double-dashed line of FIG. 14. The optical fiber shows the chromatic dispersion which is less than that of the conventional NZ-DSF at the L-band, and can most flexibly be used for wide band and high-speed transmission.

However, even if the above type of optical fiber is used, when high-speed transmission of 40 Gb/s is carried out, an SC-DCF is necessary to dispersion-compensate. The RDS of the optical fiber is 0.036 to 0.040 nm$^{-1}$, it is necessary to design an SC-DCF only for this optical fiber. Using the SC-DCF causes increased manufacturing cost all over optical fiber transmission path.

BRIEF SUMMARY OF THE INVENTION

The present invention is provided in view of the problems described above, and an object is the provision of an non-zero dispersion shifted fiber having a chromatic dispersion enabling transmission over S-band to C-band to L-band, and having almost the same RDS as a normal single-mode optical fiber over C-band to L-band, in order to provide an optical transmission path in which high-speed transmission can be carried out without an SC-DCF only for the non-zero dispersion shifted fiber.

To achieve the above object, the first aspect of the present invention is an optical fiber having a chromatic dispersion of +1.0 ps/nm/km or more at 1460 nm wavelength band, a dispersion slope of 0.04 ps/nm²/km or less at 1550 nm wavelength band, and a cutoff wavelength of 1450 nm or less, wherein a relation of an RDS, which is a value of the dispersion slope to the chromatic dispersion, to a wavelength λ is $-1.67 \times 10^{-5}\lambda + 0.0300 \geq RDS(\lambda) \geq -1.67 \times 10^{-5}\lambda + 0.0285$.

According to the above aspect, the obtained optical fiber has the chromatic dispersion characteristics enabling optical transmission over S-band to C-band to L-band, resulting in a wavelength multiplexing transmission, and the obtained optical fiber has almost the same RDS as a normal single-mode optical fiber and the SC-DCF thereof over C-band to L-band, as a result, the chromatic dispersion and the dispersion slope can be compensated using the SC-DCF for normal single-mode optical fiber over C-band to L-band.

The second aspect of the present invention is an optical fiber having a chromatic dispersion of +1.0 ps/nm/km or more at the 1460 nm wavelength band, a dispersion slope of 0.04 ps/nm²/km or less at 1550 nm wavelength band, and a cutoff wavelength of 1450 nm or less, comprising wavelength bandwidth having wavelength bandwidths containing over 115% and less than 115% of dispersion slope compensating coefficient, or having wavelength bandwidths containing over 100% and less than 100% of dispersion slope compensating coefficient in a wavelength bandwidth in which dispersion compensation is carried out; a dispersion slope compensating coefficient at long-wavelength side being 80% to 150% or being 100% to 130% in a wavelength bandwidth in which dispersion compensation is carried out; and a dispersion slope-compensating coefficient at short-wavelength side being 170% or less or 150% or less in a wavelength bandwidth in which dispersion compensation is carried out using a dispersion compensating optical fiber.

According to the above aspect, in the optical fiber, the wavelength multiplexing transmission over S-band to C-band to L-band can be carried out since the optical fiber has the chromatic dispersion characteristics in which optical transmission can be carried out over S-band to C-band to L-band, and further, since the optical fiber over C-band to L-band has the same RDS as a normal single-mode optical fiber and an SC-DCF thereof have, the chromatic dispersion and the dispersion slope can be compensated using the SC-DCF for normal single-mode optical fiber.

In the optical fiber according to the second aspect, the dispersion compensating optical fiber may be for dispersion-compensating a single-mode optical fiber such as one for use at 1.3 μm.

In the optical fiber according to the first or second aspect, an effective core area may be 35 to 60 μm², or a mode field diameter is 7 to 9 μm.

The optical fiber according to the first or second aspect comprises a central core, two or more ring cores provided on the circumference of the center core, and a cladding provided on the circumference of the outermost ring core, wherein two or more ring cores have different refractive indices, and when a refractive index of the central core is designated as $n_1$, refractive indices of the ring cores are designated as $n_2, n_3, \ldots$, from the central core side to the outside, and a refractive index of the cladding is designated as $n_c$, a relation thereof may be $n_1 > n_3 > n_c > n_2$.

In the above optical fiber, a relative refractive index difference of the central core may be 0.4 to 0.6%.

In the above optical fiber, when $\Delta_n(r)$ indicates a relative refractive index difference (%) of the n-th core, r indicates a radius (μm) of the optical fiber, $r_n$ indicates a radius (μm) of the n-th core, and $r_{n-1}$ indicates a radius (μm) of the (n−1)-th core, in a refractive index volume Vn defined by expression (2), a ratio of a refractive index volume in the ring core area $V_2$ which is adjacent to the central core to a refractive index volume in the central core area $V_1$ ($V_2/V_1$) may be −3.0 to −1.0.

$$V_n = \int_{r_{n-1}}^{r_n} \Delta_n(r) \cdot r dr \qquad (2)$$

In the optical fiber having a relative refractive index difference of the central core of 0.4 to 0.6%, a refractive index volume in the ring core area $V_2$ which is adjacent to the central core to a refractive index volume in the central core area $V_1$ ($V_2/V_1$) may be −2.0 to −1.0.

Furthermore, an optical transmission path is formed by combining any one of the above optical fibers and a dispersion compensating optical fiber.

According to the optical transmission path, high-speed transmission having 40 Gb/s over C-band to L-band can be carried out.

In the above optical fiber, more preferably, there are wavelength bandwidth of more than 100% compensating coefficient of dispersion slope and wavelength bandwidth of less than 100% compensating coefficient of dispersion slope; and compensating coefficient of dispersion slope is 100 to 130% at the long wavelength side of wavelength bandwidth to be subjected to dispersion compensation, and compensating coefficient of dispersion slope is 150% or less at the short wavelength side of wavelength bandwidth to be subjected to dispersion compensation. Accordingly, wavelength division multiplexing transmission can be carried out over S-band to C-band to L-band, and the optical fiber can compensate chromatic dispersion and dispersion slope over C-band to L-band using the SC-DCF for the normal single-mode optical fiber. Moreover, since an optical transmission path is formed by combining any one of the above optical fibers and a dispersion compensating optical fiber, high-speed transmission having 40 Gb/s over C-band to L-band can be carried out.

DETAILED DESCRIPTION OF THE INVENTION

The present invention will be described in detail as follows.

The optical fiber of the first embodiment according to the present invention is composed of a central core, two or more ring cores, which have different refractive indices, provided on the circumference of the central core, and a cladding provided on the circumference of the outermost ring core. The optical fiber has a refractive index profile having a relation of $n_1 > n_3 > n_c > n_2$ when a refractive index of the central core is designated as $n_1$, refractive indices of the ring cores are designated as $n_2, n_3, \ldots$, from the central core side to the outside, and a refractive index of the cladding is designated as $n_c$.

Figure 1:
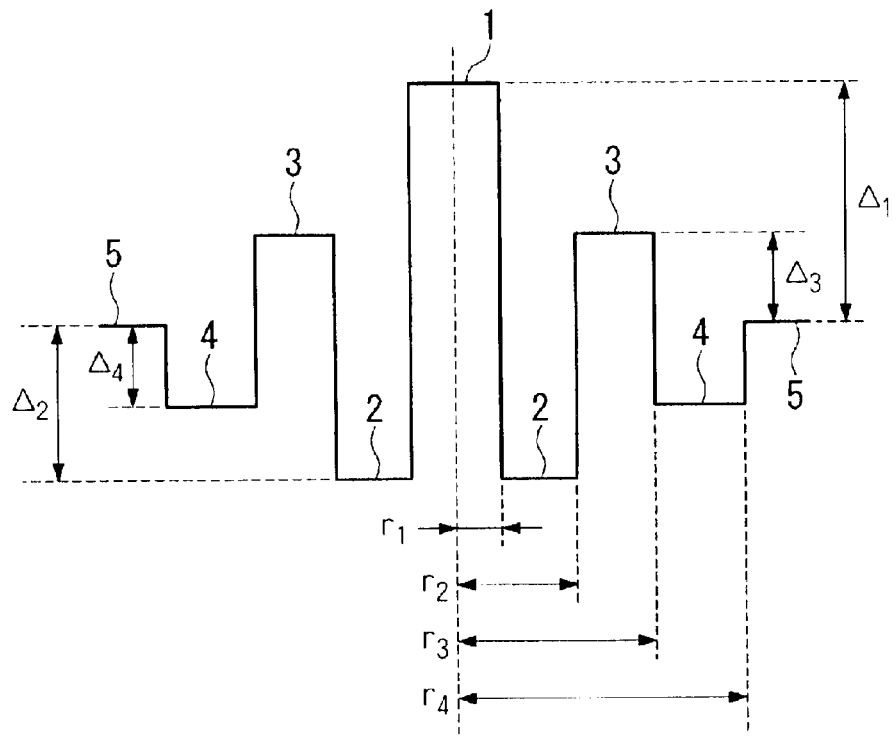
FIG. 1 is a view showing an example of a refractive index profile of an optical fiber according to the present invention.

FIG. 1 shows an example of a refractive index profile of the optical fiber according to the present invention.

FIG. 1 shows central core 1, a depressed core 2 provided on the peripheral of central core 1, a ring core 3 provided on the peripheral of depressed core 2, core having low refractive index 4 provided on the peripheral of ring core 3, and cladding 5. The term "depressed core" is defined as a core provided around central core 1 in the present invention.

In FIG. 1, a radius of central core 1 is designated as $r_1$, a radius of depressed core 2 is designated as $r_2$, a radius of ring core 3 is designated as $r_3$, a radius of core having low refractive index 4 is designated as $r_4$, a relative refractive index difference of central core 1 to cladding 5 is designated as $\Delta_1$, a relative refractive index difference of depressed core 2 to cladding 5 is designated as $\Delta_2$, a relative refractive index difference of ring core 3 to cladding 5 is designated as $\Delta_3$, and a relative refractive index difference of a core having low refractive index 4 to cladding 5 is designated as $\Delta_4$.

As shown in FIG. 1, central core 1 has a greater refractive index than cladding 5 has, depressed core 2 has a lesser refractive index than cladding 5 has, ring core 3 has a greater refractive index than cladding 5 has, and a core having a low refractive index 4 has a lower one than cladding 5.

The refractive index profile of the optical fiber of this embodiment is preferably within the following range shown in Table 1.

TABLE 1

|  | Core 1 | Core 2 | Core 3 | Core 4 |
| --- | --- | --- | --- | --- |
| Relative refractive index difference (%) | 0.40~0.60 | −0.05~−0.60 | 0.05~0.50 | 0~−0.25 |
| Radius of core (μm) | 2.5~4.5 | 4.5~10 | 6~18 | 8~25 |

Furthermore, radius and relative refractive index difference of each core preferably satisfy the following relationships.

Figure 2:
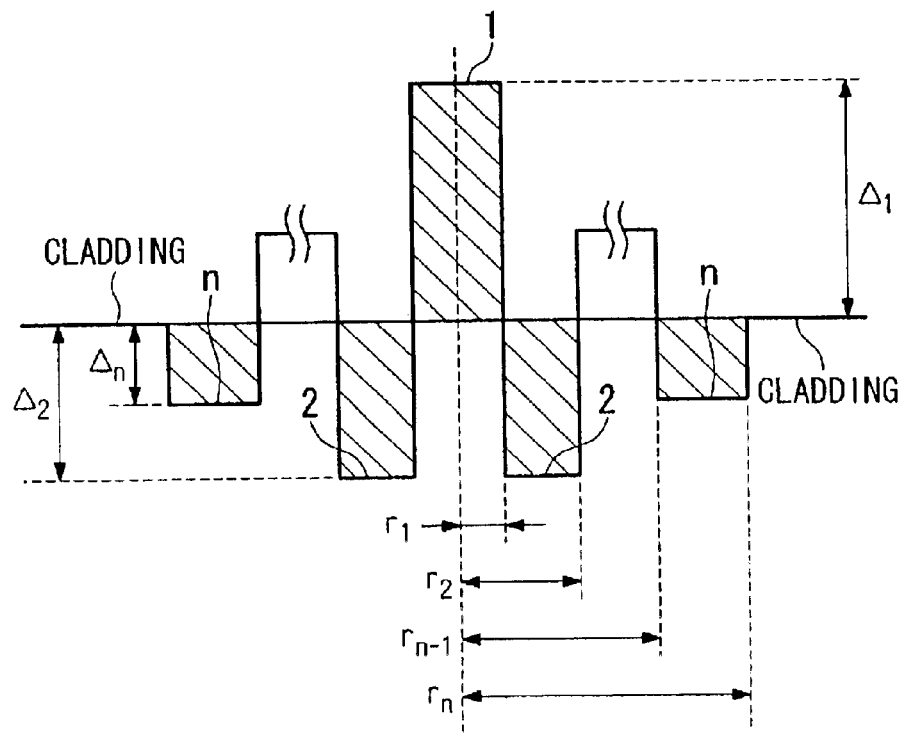
FIG. 2 is a view showing an example of a refractive index profile of the optical fiber according to the present invention.

In order to prescribe a relationship of parameters, refractive index volume Vn defined by expression (2) is introduced. In expression (2), $\Delta_n(r)$ indicates a relative refractive index difference (%) of the n-th core, r indicates a radius (μm) of the optical fiber, $r_n$ indicates a radius (μm) of the n-th core, and $r_{n-1}$ indicates a radius (μm) of the (n−1)-th core. A refractive index profile of (n−1)-th core and n-th core is shown in FIG. 2. In FIG. 2, n indicates n-th core. Refractive index volume Vn of each core is schematically shown by oblique lines. Apparent volume of cylindrical cores estimated from parts filled by oblique lines differs from actual volume, that is, refractive index volume Vn defined by expression (2) in which there is no $2\pi$.

Figure 3:
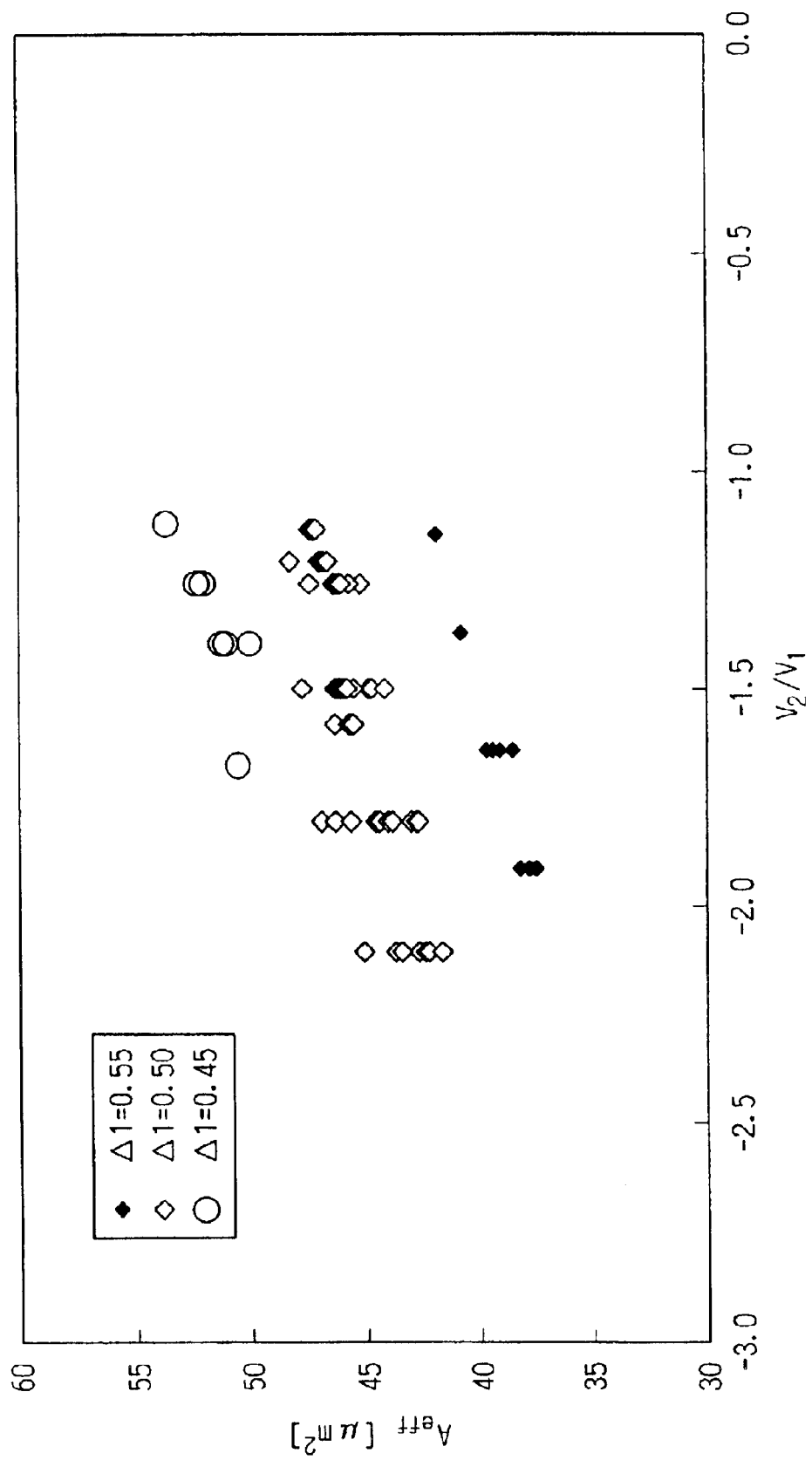
FIG. 3 is a view showing a relation of a relative refractive index difference of the central core $\Delta_1$, a refractive index volume of the central core $V_1$, a refractive index volume of a depressed core $V_2$, and an effective core area $A_{eff}$.

FIG. 3 is a relationship of relative refractive index difference of central core 1, $\Delta_1$, refractive index volume of central core 1, $V_1$, refractive index volume of depressed core 2, V2, and effective core area $A_{eff}$, and shows change of effective core area $A_{eff}$ to $V_2/V_1$ when $\Delta_1$ changes to 0.45%, 0.50%, or 0.55%.

As described above, $\Delta_1$ within 0.40 to 0.60% is preferable. When $\Delta_1$ is small, $A_{eff}$ can be increased, however, $\Delta_1$ less than 0.40% is not preferable in practical use in view of macrobending and microbending. When $\Delta_1$ is greater than 0.60%, it is difficult to ensure $A_{eff}$ of 35 μm or more, it is not preferable in view of reduction of non-linear effects.

Furthermore, $V_2/V_1$ is preferably −3.0 to −1.0, and more preferably, $V_2/V_1$ is −2.0 to −1.0. Accordingly, refractive index profile showing further increased $A_{eff}$ can be designed. When $V_2/V_1$ is less than −3.0, it is difficult to set bending loss within a practical range. On the other hand, when $V_2/V_1$ is greater than −1.0, it is difficult to set the cutoff wavelength at 1460 nm or less.

There are many patterns of relationships of radius and refractive index satisfying the above requirements, and there are more patterns of relationships further including ring core 3 and core having low refractive index 4. Based on the design algorithm of refractive index profile disclosed in Japanese Patent Application Filing No. 2001-306689, controllability and required optical characteristics of a manufacturing device for practical use are considered, and finally, the best pattern is selected from among many patterns.

Four samples of optical fibers having the refractive index satisfying the above requirements were prepared. Optical characteristics of these optical fibers are shown in Table 2.

TABLE 2

| | Wavelength | Sample 1 | Sample 2 | Sample 3 | Sample 4 |
|---|---|---|---|---|---|
| Transmission loss [dB/km] | 1550 nm | 0.201 | 0.195 | 0.202 | 0.198 |
| Cable cutoff wavelength $\lambda cc$ [nm] | — | 1350 | 1426 | 1335 | 1344 |
| Effective core area $A_{eff}$ [$\mu m^2$] | 1550 nm | 45.83 | 42.98 | 45.96 | 46.65 |
| MFD [$\mu m$] | 1550 nm | 7.62 | 7.40 | 7.63 | 7.69 |
| Chromatic dispersion [ps/nm/km] | 1460 nm | 3.86 | 3.75 | 2.99 | 2.84 |
| | 1550 nm | 6.00 | 6.01 | 4.98 | 5.02 |
| | 1625 nm | 7.32 | 7.39 | 6.29 | 6.57 |
| Dispersion slope [ps/nm$^2$/km] | 1460 nm | 0.0301 | 0.0312 | 0.0278 | 0.0293 |
| | 1550 nm | 0.0190 | 0.0202 | 0.0180 | 0.0208 |
| | 1625 nm | 0.0178 | 0.0177 | 0.0185 | 0.0219 |
| RDS [nm$^{-1}$] | 1460 nm | 0.0078 | 0.0083 | 0.0093 | 0.0103 |
| | 1550 nm | 0.0032 | 0.0034 | 0.0036 | 0.0041 |
| | 1625 nm | 0.0024 | 0.0024 | 0.0029 | 0.0033 |
| Bending loss (dB/m) | 1550 nm | 7.6 | 5.0 | 9.6 | 8.5 |
| PMD [ps/$\sqrt{km}$] | 1550 nm band | 0.05 | 0.06 | 0.05 | 0.02 |

MFD: Mode field diameter
PMD: Polarization mode dispersion

As shown in Table 2, each optical fiber has a chromatic dispersion being +1.0 ps/nm/km or more at 1460 nm wavelength in the S-band, and a dispersion slope being 0.04 ps/nm$^2$/km or less and cutoff wavelength being 1450 nm or less at 1550 nm wavelength in the C-band. These optical fibers are preferably used for WDM transmission because of chromatic dispersion being +2 ps/nm/km or more at S-band.

Furthermore, each chromatic dispersion in the L-band is +8 ps/nm/km or less which is a smaller value than a conventional NZ-DSF. Accordingly, in 10 Gb/s transmission, transmission can be carried out about 200 km in the C-band and about 100 km in the L-band without dispersion compensating.

These optical fibers have effective core areas being from 35 $\mu m^2$ to 60 $\mu m^2$, and mode field diameter being from 7 $\mu m$ to 9 $\mu m$.

Figure 4:
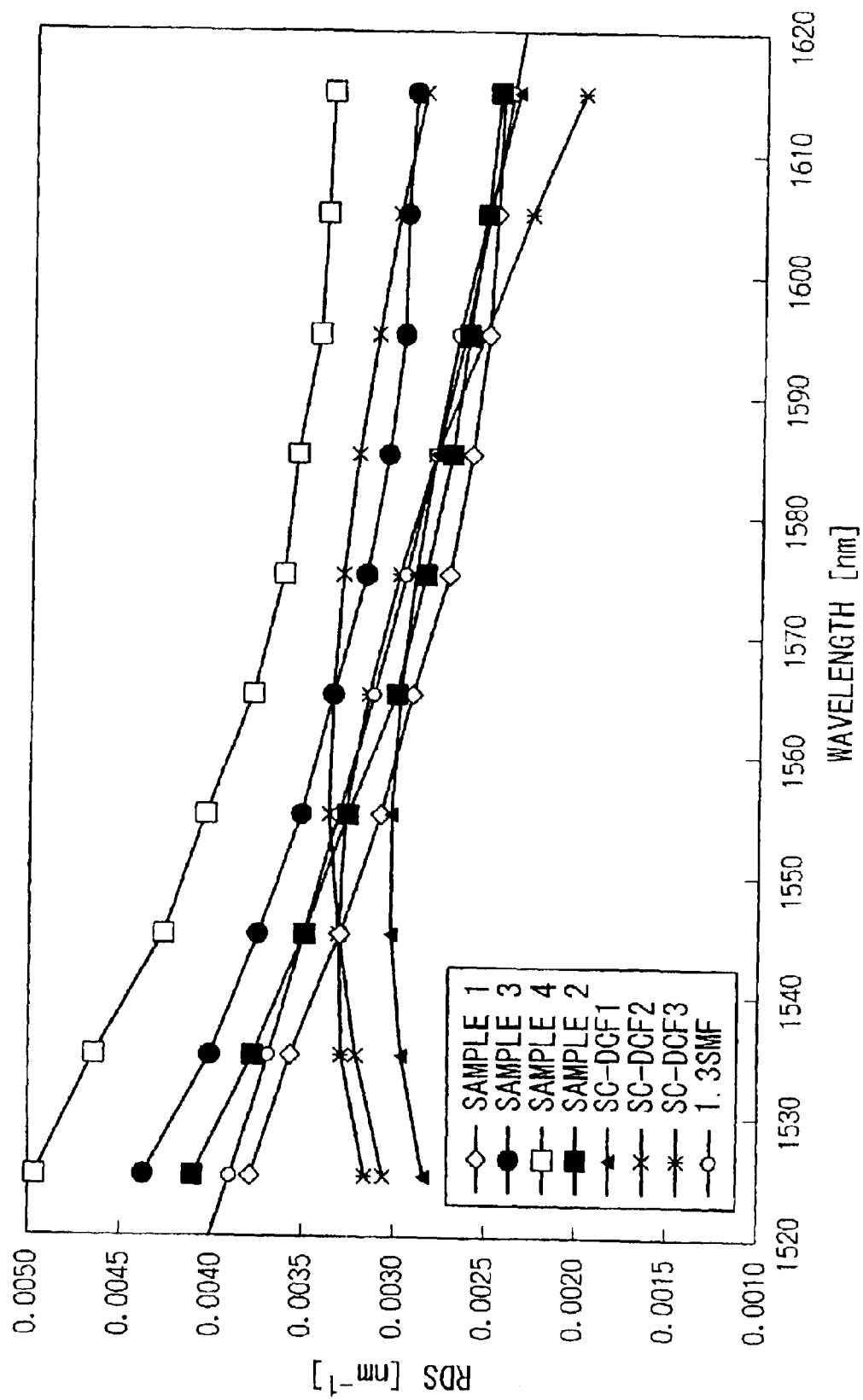
FIG. 4 is a view showing wavelength dependency of the optical fiber and RDS of an SC-DCF according to the present invention.

FIG. 4 shows chromatic dispersion characteristics of a typical SC-DCF for 1.3 SMF, and wavelength characteristics of RDS. Samples 1, 2, 3, and 4 are preparation examples of the optical fiber according to the present invention, and SC-DCFs 1, 2, and 3 are slope compensating dispersion compensation fibers for compensating 1.3 SMF. Examples of 1.3 SMF are also shown in FIG. 4. FIG. 4 shows that each optical fiber of samples 1, 2, 3, and 4 has the same wavelength characteristics of RDS as 1.3 SMF or SC-DCF.

As a result, this example of the optical fiber can compensate dispersion slope using slope compensating dispersion compensation optical fiber which is usually used in order to dispersion-compensate 1.3 SMF.

Next, the optical transmission path formed by combining the above optical fibers and the dispersion compensating optical fiber for 1.3 SMF will be described below.

FIGS. 5 to 8 show evaluation results of residual chromatic dispersion of the optical transmission path formed by combining the optical fiber according to the present invention and SC-DCF with the ratio of length as shown in Table 3.

TABLE 3

| | SC-DCF 1 (Type 1) | SC-DCF 2 (Type 2) | SC-DCF 3 (Type 3) |
|---|---|---|---|
| Sample 1 | 11.8 | 11.0 | 13.0 |
| Sample 2 | 11.7 | 11.0 | 13.0 |
| Sample 3 | 14.0 | 13.1 | 15.7 |
| Sample 4 | 13.6 | 12.9 | 15.4 |

The ratio of length = (length of sample optical fiber)/(length of SC-DCF)

Figure 5:
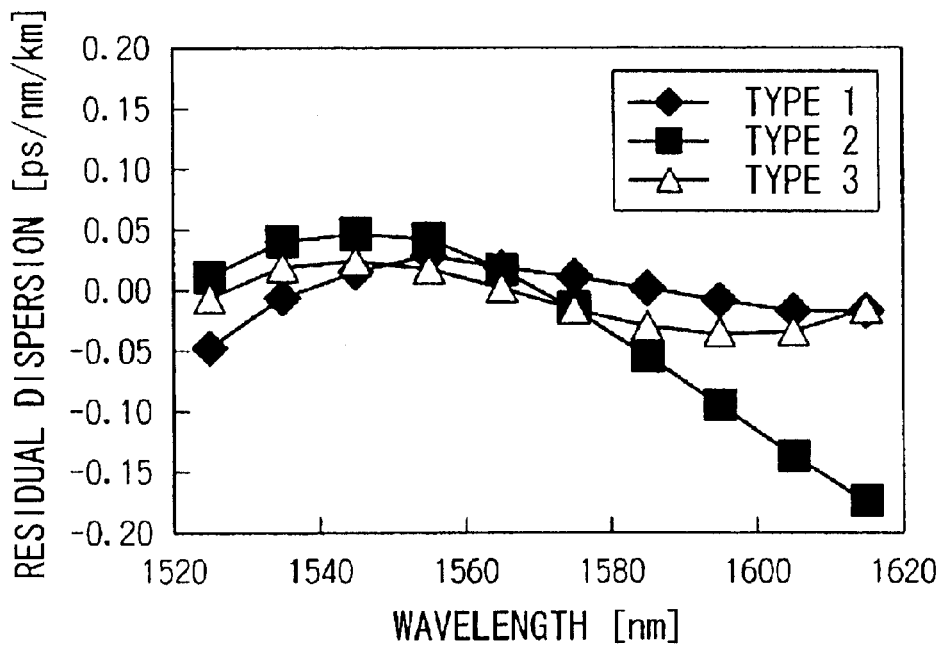
FIG. 5 is a view showing a residual dispersion of the optical transmission path composed of an optical fiber of sample 1 which is an example of the optical fiber according to the present invention, and a dispersion compensating optical fiber.
Figure 6:
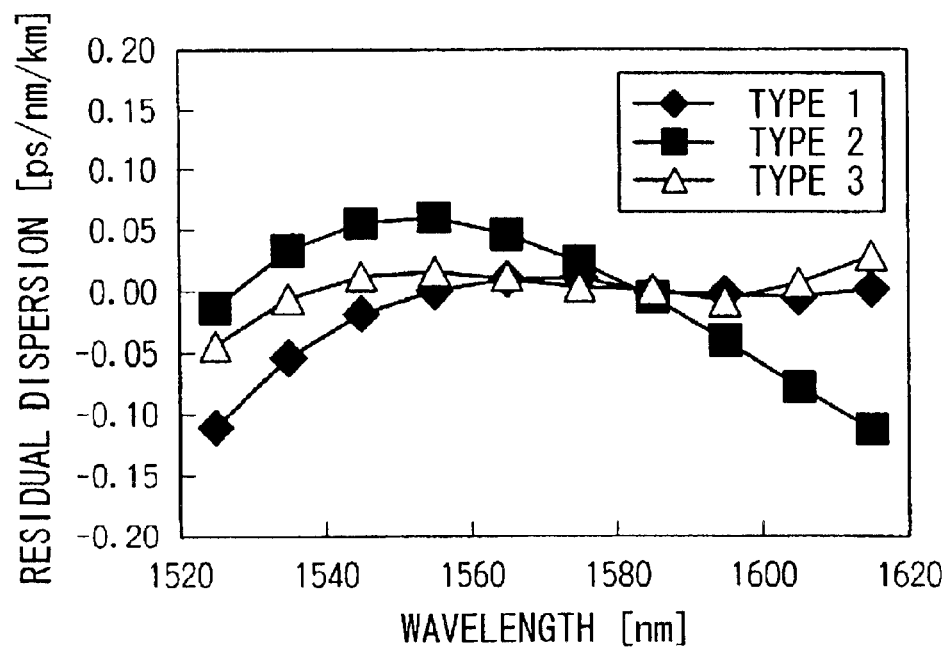
FIG. 6 is a view showing a residual dispersion of the optical transmission path composed of an optical fiber of sample 2 which is an example of the optical fiber according to the present invention, and a dispersion compensating optical fiber.
Figure 7:
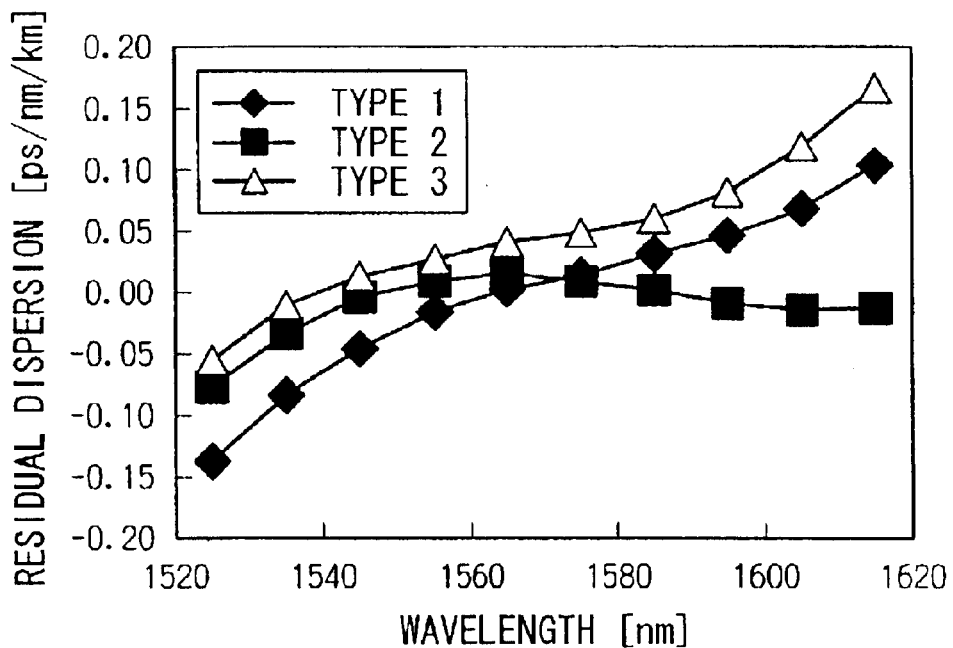
FIG. 7 is a view showing a residual dispersion of the optical transmission path composed of an optical fiber of sample 3 which is an example of the optical fiber according to the present invention, and a dispersion compensating optical fiber.
Figure 8:
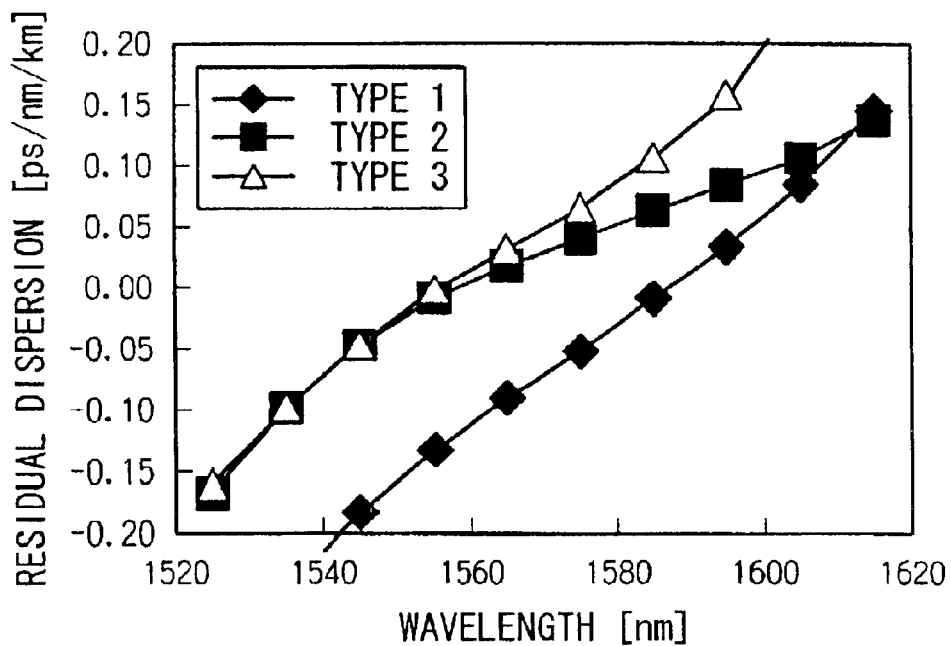
FIG. 8 is a view showing a residual dispersion of the optical transmission path composed of an optical fiber of sample 4 which is an example of the optical fiber according to the present invention, and a dispersion compensating optical fiber.

FIG. 5 shows residual dispersion of the optical transmission path which is dispersion-compensated the optical fiber of sample I with three types of SC-DCF. Similarly, FIG. 6 shows residual dispersion of the optical transmission path which is dispersion-compensated the optical fiber of sample 2 with three types of SC-DCF, FIG. 7 shows residual dispersion of the optical transmission path which dispersion-compensates the optical fiber of sample 3 with three types of SC-DCF, and FIG. 8 shows residual dispersion of the optical transmission path which dispersion-compensates the optical fiber of sample 4 with three types of SC-DCF. In high-speed transmission system having 40 Gb/s, in general, allowable residual dispersion value is about 60 ps/nm. As shown in FIGS. 5, 6, 7, and 8, combining each optical fiber with a suitable SC-DCF enables the reduced residual dispersion value of ±0.2 ps/nm/km or less. In the optical transmission path using the optical fiber and the SC-DCF of the present invention, transmission having 40 Gb/s can be carried out for about 300 km.

Furthermore, in sample optical fibers 1 to 3, the residual dispersion value at the area over C-band to L-band can be reduced to ±0.1 ps/nm/km. In this case, transmission having 40 Gb/s can be carried out about 600 km. If the area to be used is limited to either C-band or L-band, the residual dispersion can be further reduced.

As the above data are analyzed, in the optical fiber having chromatic dispersion at 1460 nm wavelength being +1.0 ps/nm/km or more, dispersion slope at 1550 nm wavelength being 0.04 ps/nm$^2$/km or less, and cutoff wavelength being 1450 nm or less, wide range dispersion compensation over S-band to C-band to L-band using the SC-DCF which dispersion-compensating 1.3 SMF can be carried out by taking into consideration with the following two parameters.

One is the relative dispersion slope (RDS)($\lambda$). Considering RDS shown in FIG. 4 and residual dispersion shown in FIGS. 5 to 8, the range of RDS($\lambda$) to be satisfied can be expressed by the following expression (3).

$$-0.67 \times 10^{-5} \lambda + 0.0300 \geq RDS(\lambda) \geq -1.67 \times 10^{-5} + 0.0285 \qquad (3)$$

Figure 9:
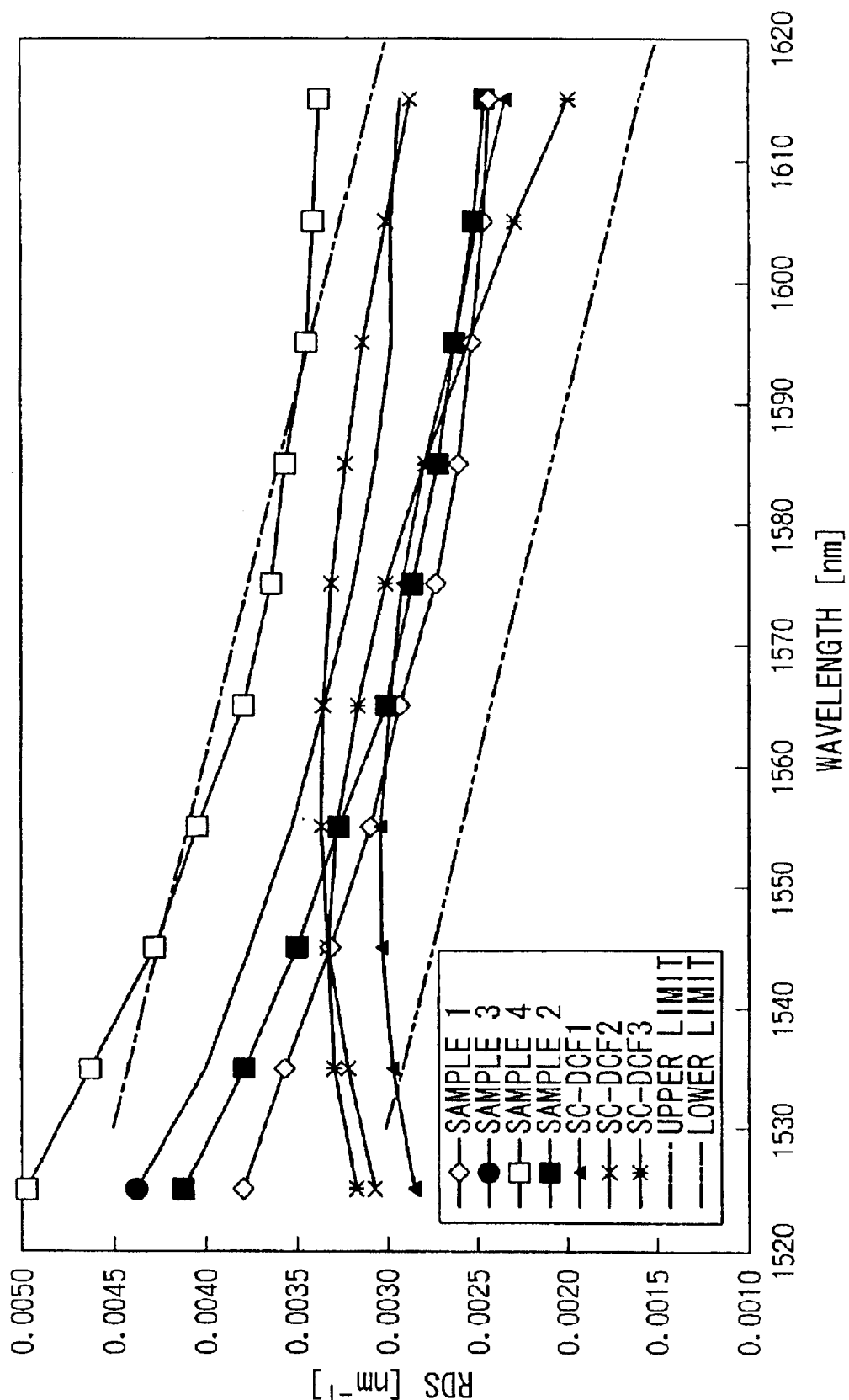
FIG. 9 is a view of a range of the RDS to be required in the optical fiber according to the present invention.

The relationship of RDS and wavelength is shown in FIG. 9. The lower limit shown in FIG. 9 is the lower limit in expression (3), and similarly, the upper limit shown in FIG. 9 is the upper limit in expression (3).

Furthermore, the condition of compensating coefficient of dispersion slope is determined to easily optimize the dispersion characteristics of the optical fiber according to the present invention into an SC-DCF for 1.3 SMF dispersion compensation.

The compensating coefficient of dispersion slope is defined by expression (4).

$$\text{Compensating coefficient of dispersion slope} = \qquad (4)$$

| RDS of compensated optical fiber |
|---|
| RDS of SC-DCF |

For example, 100% of the compensating coefficient of dispersion slope means completely compensating the chromatic dispersion and dispersion slope of an optical fiber to be compensated.

Figure 10:
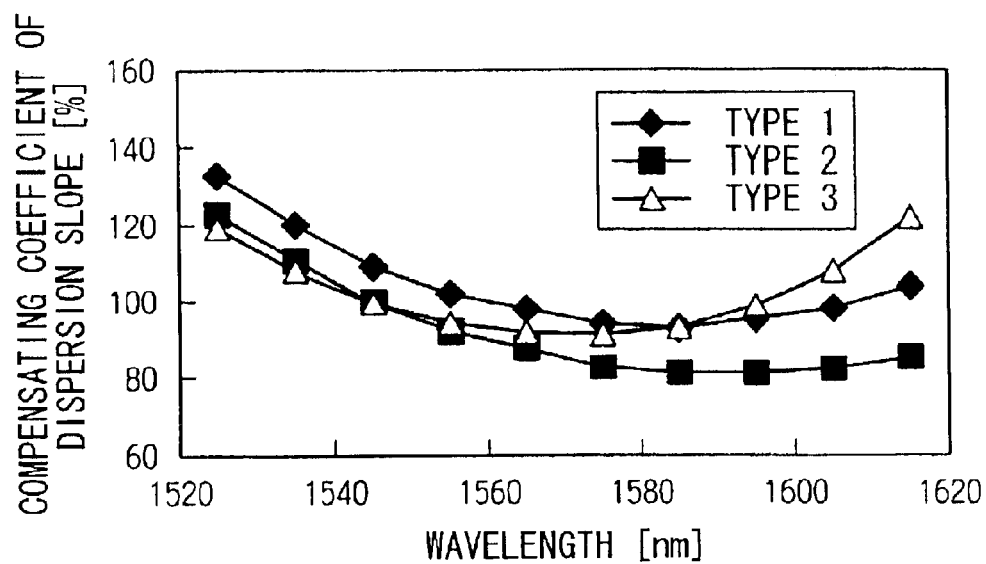
FIG. 10 is a view of dispersion slope compensating coefficient of the optical transmission path composed of an optical fiber of sample 1 which is an example of the optical fiber according to the present invention, and a dispersion compensating optical fiber.
Figure 11:
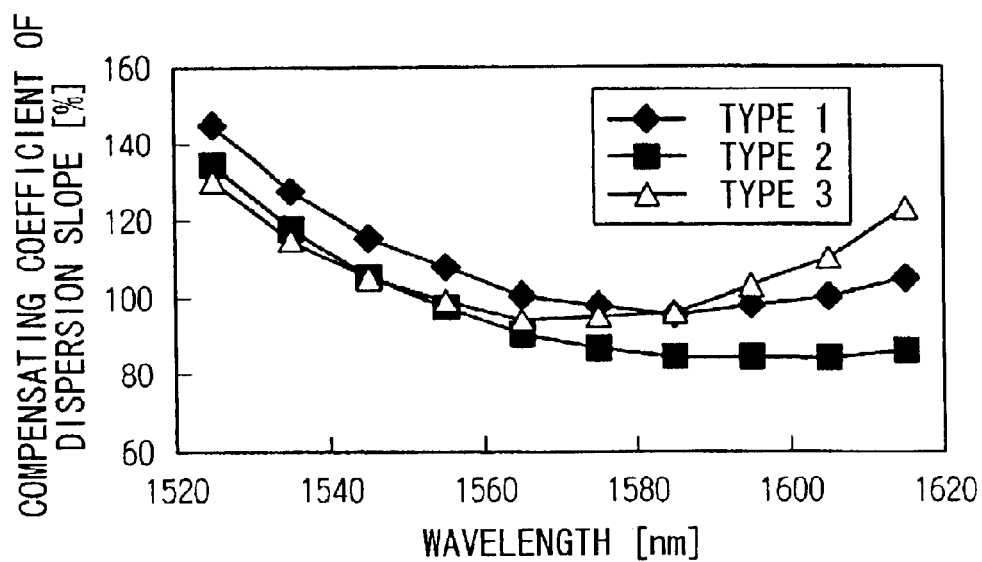
FIG. 11 is a view of dispersion slope compensating coefficient of the optical transmission path composed of an optical fiber of sample 2 which is an example of the optical fiber according to the present invention, and a dispersion compensating optical fiber.
Figure 12:
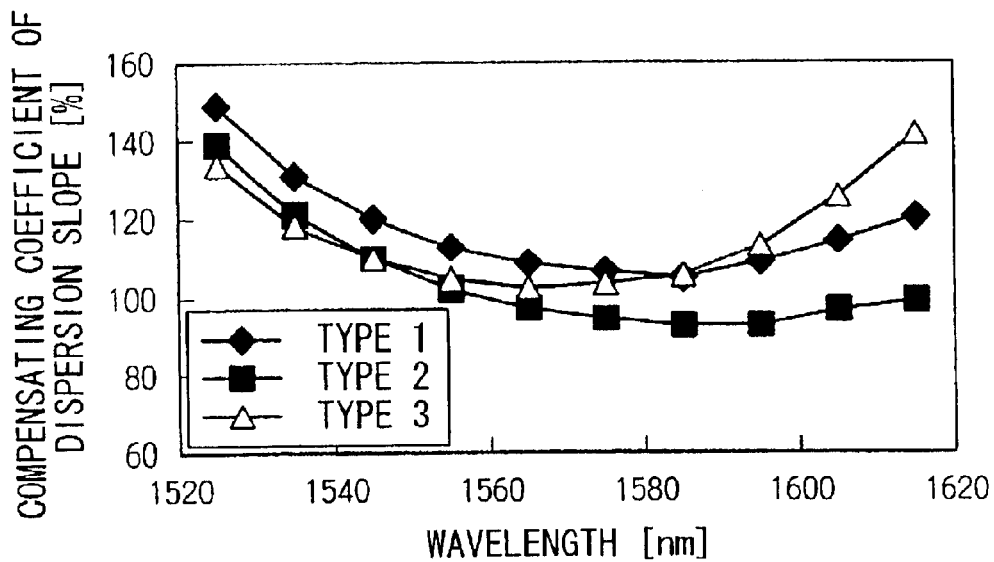
FIG. 12 is a view of dispersion slope compensating coefficient of the optical transmission path composed of an optical fiber of sample 3 which is an example of the optical fiber according to the present invention, and a dispersion compensating optical fiber.
Figure 13:
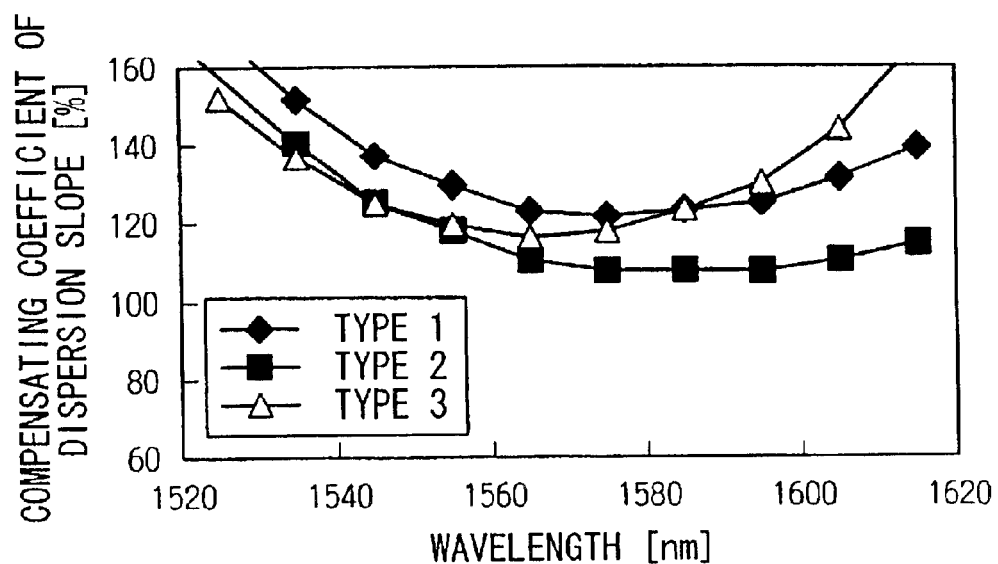
FIG. 13 is a view of dispersion slope compensating coefficient of the optical transmission path composed of an optical fiber of sample 4 which is an example of the optical fiber according to the present invention, and a dispersion compensating optical fiber.
Figure 14:
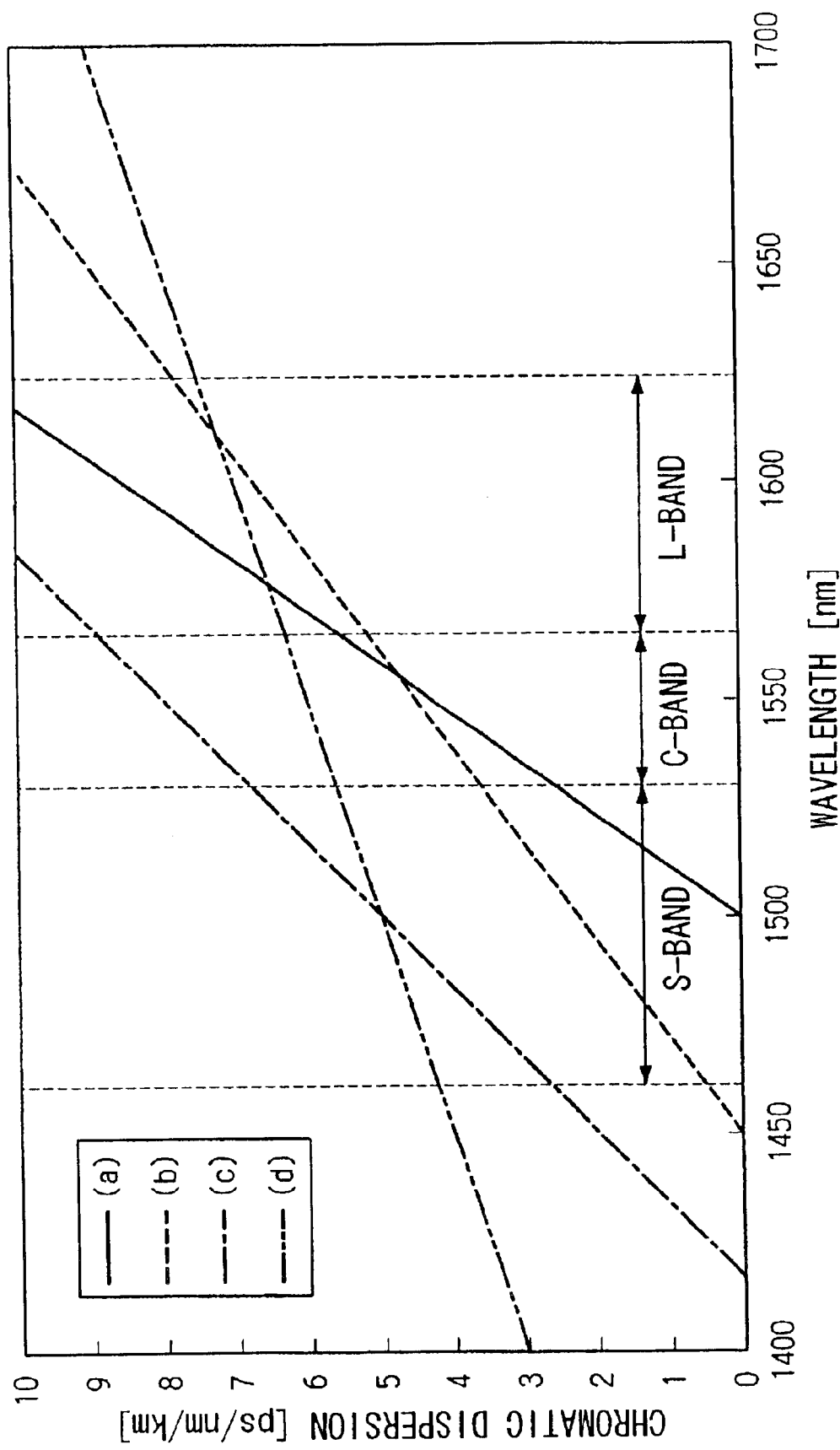
FIG. 14 is a view of an example of chromatic dispersion characteristics of an optical fiber for WDM.

Wavelength dependence of compensating coefficient of dispersion slope of the optical transmission path formed by combining the sample optical fiber and the SC-DCF is shown in FIGS. 10 to 13. FIG. 10 shows wavelength reliability of compensating coefficient of dispersion slope when the optical fiber of sample 1 is dispersion-compensated by three types, type 1, type 2, and type 3, of SC-DCFs. FIG. 11 shows wavelength reliability of compensating coefficient of dispersion slope when the optical fiber of sample is dispersion-compensated by three types, type 1, type 2, and type 3, of SC-DCFs. FIG. 12 shows wavelength reliability of compensating coefficient of dispersion slope when the optical fiber of sample 3 is dispersion-compensated by three types, type 1, type 2, and type 3, of SC-DCFs. FIG. 13 shows wavelength reliability of compensating coefficient of dispersion slope when the optical fiber of sample 4 is dispersion-compensated by three types, type 1, type 2, and type 3, of SC-DCFs.

As shown in FIGS. 10 to 13, when either or both C-band and L-band are dispersion-compensated using the SC-DCF for 1.3 SMF dispersion compensation, the condition of the compensating coefficient of dispersion slope to be satisfied is as follows.

First, in the wavelength bandwidth to be subjected to dispersion compensation, preferably, there are wavelength bandwidths of more than 115% compensating coefficient of dispersion slope and wavelength bandwidths of less than 115% compensating coefficient of dispersion slope, and more preferably, there are wavelength bandwidths of more than 100% compensating coefficient of dispersion slope and wavelength bandwidths of less than 100% compensating coefficient of dispersion slope.

Second, at the long wavelength side of wavelength bandwidth to be subjected to dispersion compensation, preferably, the compensating coefficient of dispersion slope is 80 to 150%, and more preferably, 100 to 130%. The long wavelength side of wavelength bandwidth to be subjected to dispersion compensation is 1580 to 1620 nm.

Third, at the short wavelength side of wavelength bandwidth to be subjected to dispersion compensation, preferably, the compensating coefficient of dispersion slope is 170% or less, and more preferably, 150% or less. The short wavelength side of wavelength bandwidth to be subjected to dispersion compensation is 1530 to 1580 nm.

According to the above optical fiber, since RDS in the optical fiber having chromatic dispersion at a 1460 nm wavelength being +1.0 ps/nm/km or more, dispersion slope at 1550 nm wavelength being 0.04 ps/nm$^2$/km or less, and cutoff wavelength being 1450 nm or less, is adjusted to satisfy expression (3) to wavelength λ, the optical fiber can have the chromatic dispersion characteristics enabling optical transmission over S-band to C-band to L-band, so that wavelength division multiplexing transmission can be carried out over S-band to C-band to L-band. Additionally, since the optical fiber has the same RDS as an SC-DCF for the normal single-mode optical fiber, the optical fiber which can compensate chromatic dispersion and dispersion slope over C-band to L-band using the SC-DCF for the normal single-mode optical fiber is obtained.

Furthermore, when the optical fiber having chromatic dispersion at 1460 nm wavelength being +1.0 ps/nm/km or more dispersion slope at 1550 nm wavelength being 0.04 ps/nm$^2$/km or less, and cutoff wavelength being 1450 nm or less; comprises compensating coefficient of dispersion slope having wavelength bandwidth being more than 115% and wavelength bandwidth being less than 115%; and compensating coefficient of dispersion slope at long wavelength side of wavelength bandwidth to be subjected to dispersion compensation being 80 to 150%, and compensating coefficient of dispersion slope at short wavelength side of wavelength bandwidth to be subjected to dispersion compensation being 170% or less, at the wavelength bandwidth to be subjected to dispersion compensation using dispersion compensating optical fiber, the optical fiber can have the chromatic dispersion characteristics enabling optical transmission over S-band to C-band to L-band, so that wavelength division multiplexing transmission can be carried out over S-band to C-band to L-band. Additionally, since the optical fiber has the same RDS as an SC-DCF for the normal single-mode optical fiber, the optical fiber which can compensate chromatic dispersion and dispersion slope over C-band to L-band using the SC-DCF for the normal single-mode optical fiber is obtained.

In the above optical fiber, more preferably, there are wavelength bandwidths of more than 100% compensating coefficient of dispersion slope and wavelength bandwidths of less than 100% compensating coefficient of dispersion slope; and compensating coefficient of dispersion slope is 100 to 130% at the long wavelength side of wavelength bandwidth to be subjected to dispersion compensation, and compensating coefficient of dispersion slope is 150% or less at the short wavelength side of wavelength bandwidth to be subjected to dispersion compensation. Accordingly, wavelength division multiplexing transmission can be carried out over S-band to C-band to L-band, and the optical fiber can compensate chromatic dispersion and dispersion slope over C-band to L-band using the SC-DCF for the normal single-mode optical fiber. Moreover, since an optical transmission path is formed by combining any one of the above optical fibers and a dispersion compensating optical fiber, high-speed transmission having 40 Gb/s over C-band to L-band can be carried out.

What is claimed is:

1. An optical fiber having a chromatic dispersion of +1.0 ps/nm/km or more at 1460 nm wavelength band, a dispersion slope of 0.04 ps/nm$^2$/km or less at 1550 nm wavelength band, and a cutoff wavelength of 1450 nm or less, wherein a relationship of an RDS, which is a value of the dispersion slope to the chromatic dispersion, to a wavelength λ is $-1.67\times10^{-5}\lambda+0.0300 \geqq RDS(\lambda) \geqq -1.67\times10^{-5}\lambda+0.0285$.

2. An optical fiber having a chromatic dispersion of +1.0 ps/nm/km or more at 1460 nm wavelength band, a dispersion slope of 0.04 ps/nm$^2$/km or less at 1550 nm wavelength band, and a cutoff wavelength of 1450 nm or less, comprising wavelength bandwidth having wavelength bandwidths containing over 115% and less than 115% of dispersion slope compensating coefficient, or having wavelength bandwidths containing over 100% and less than 100% of dispersion slope compensating coefficient in a wavelength bandwidth in which dispersion compensation is carried out; a dispersion slope compensating coefficient at long-wavelength side being 80% to 150% or being 100% to 130% in a wavelength bandwidth in which dispersion compensation is carried out; and a dispersion slope compensating coefficient at short-wavelength side being 170% or less or 150% or less in a wavelength bandwidth in which dispersion compensation is carried out using a dispersion compensating optical fiber. compensating optical fiber.

3. An optical fiber according to claim 2, wherein the dispersion compensating optical fiber is for dispersion-compensating a single-mode optical fiber such as one for use at 1.3 μm.

4. An optical fiber according to claim 1, comprising an effective core area of 35 to 60 μm², or a mode field diameter of 7 to 9 μm.

5. An optical fiber according to claim 2, comprising an effective core area of 35 to 60 μm², or a mode field diameter of 7 to 9 μm.

6. An optical fiber according to claim 1, comprises a central core, two or more ring cores provided on the circumference of the center core, and a cladding provided on the circumference of the outermost ring core, wherein two or more ring cores have different refractive indices, and when a refractive index of the central core is designated as $n_1$, refractive indices of the ring cores are designated as $n_2$, $n_3$, ..., from the central core side to the outside, and a refractive index of the cladding is designated as $n_c$, and a relationship thereof is $n_1 > n_3 > n_c > n_2$.

7. An optical fiber according to claim 2, comprises a central core, two or more ring cores provided on the circumference of the center core, and a cladding provided on the circumference of the outermost ring core, wherein two or more ring cores have different refractive indices, and when a refractive index of the central core is designated as $n_1$, refractive indices of the ring cores are designated as $n_2$, $n_3$, ..., from the central core side to the outside, and a refractive index of the cladding is designated as $n_c$, and a relationship thereof is $n_1 > n_3 > n_c > n_2$.

8. An optical fiber according to claim 6, comprising a relative refractive index difference of the central core of 0.4 to 0.6%.

9. An optical fiber according to claim 7, comprising a relative refractive index difference of the central core of 0.4 to 0.6%.

10. An optical fiber according to claim 8 or 9, when $\Delta_n(r)$ indicates a relative refractive index difference (%) of the n-th core, r indicates a radius (μm) of the optical fiber, $r_n$ indicates a radius (μm) of the n-th core, and $r_{n-1}$ indicates a radius (μm) of the (n−1)-th core, in a refractive index volume Vn defined by expression (2), a ratio of a refractive index volume in the ring core area $V_2$ which is adjacent to the central core to a refractive index volume in the central core area $V_1$ ($V_2/V_1$) is −3.0 to −1.0:

$$V_n = \int_{r_{n-1}}^{r_n} \Delta_n(r) \cdot r\, dr \qquad (2)$$

11. An optical fiber according to claim 8 or 9, wherein a ratio ($V_2/V_1$) of a refractive index volume in the ring core area $V_2$ which is adjacent to the central core to a refractive index volume in the central core area $V_1$, is −2.0 to −1.0.

12. An optical transmission path comprising any one of optical fibers according to claim 1 or 2 and a dispersion compensating optical fiber.

* * * * *